United States Patent
Chen et al.

(10) Patent No.: US 9,163,569 B2
(45) Date of Patent: Oct. 20, 2015

(54) INDIRECT HCCI COMBUSTION CONTROL

(75) Inventors: Jyh-Shin Chen, Troy, MI (US); Jun-Mo Kang, Ann Arbor, MI (US); Chen-Fang Chang, Troy, MI (US); Paul M. Najt, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1081 days.

(21) Appl. No.: 13/217,464

(22) Filed: Aug. 25, 2011

(65) Prior Publication Data

US 2013/0054115 A1    Feb. 28, 2013

(51) Int. Cl.

| | |
|---|---|
| F02D 41/30 | (2006.01) |
| F02D 41/00 | (2006.01) |
| F02D 41/14 | (2006.01) |
| F02D 41/18 | (2006.01) |
| F02D 41/40 | (2006.01) |
| F02P 5/04 | (2006.01) |
| F02D 35/02 | (2006.01) |
| F02D 37/02 | (2006.01) |
| F02P 5/153 | (2006.01) |
| F02P 5/145 | (2006.01) |
| F02P 5/15 | (2006.01) |

(52) U.S. Cl.
CPC .......... *F02D 41/0002* (2013.01); *F02D 35/023* (2013.01); *F02D 35/028* (2013.01); *F02D 37/02* (2013.01); *F02D 41/0052* (2013.01); *F02D 41/144* (2013.01); *F02D 41/1454* (2013.01); *F02D 41/18* (2013.01); *F02D 41/401* (2013.01); *F02P 5/045* (2013.01); *F02P 5/153* (2013.01); *F02D 35/022* (2013.01); *F02D 2041/001* (2013.01); *F02D 2200/0406* (2013.01); *F02P 5/145* (2013.01); *F02P 5/151* (2013.01); *Y02T 10/128* (2013.01); *Y02T 10/42* (2013.01); *Y02T 10/44* (2013.01); *Y02T 10/46* (2013.01); *Y02T 10/47* (2013.01)

(58) Field of Classification Search
CPC . F02D 41/30; F02D 41/0025; F02D 41/0027; Y02T 10/47; Y02T 10/44
USPC ......... 701/101, 102, 103, 104, 105, 108, 109, 701/115
See application file for complete search history.

(56) References Cited

U.S. PATENT DOCUMENTS

| | | | |
|---|---|---|---|
| 6,672,060 B1 * | 1/2004 | Buckland et al. | 60/602 |
| 7,367,308 B2 * | 5/2008 | Kuo et al. | 123/295 |
| 7,370,616 B2 * | 5/2008 | Kuo et al. | 123/90.15 |
| 7,370,633 B2 * | 5/2008 | Kang et al. | 123/305 |
| 8,210,158 B2 * | 7/2012 | Kang et al. | 123/568.19 |
| 2006/0196466 A1 * | 9/2006 | Kuo et al. | 123/295 |
| 2006/0196467 A1 * | 9/2006 | Kang et al. | 123/305 |
| 2006/0196468 A1 * | 9/2006 | Chang et al. | 123/305 |
| 2006/0196469 A1 * | 9/2006 | Kuo et al. | 123/305 |
| 2006/0243241 A1 * | 11/2006 | Kuo et al. | 123/295 |
| 2009/0164104 A1 | 6/2009 | Wermuth et al. | |
| 2011/0283972 A1 * | 11/2011 | Wermuth et al. | 123/406.12 |

* cited by examiner

*Primary Examiner* — Hai Huynh
*Assistant Examiner* — Raza Najmuddin (57) ABSTRACT

A method for controlling combustion in a spark-ignition direct-injection internal combustion engine includes monitoring at least one combustion input parameter, and when the at least one monitored combustion input parameter deviates from a respective desired combustion input parameter, adjusting a combustion input mechanism associated with controlling the at least one monitored combustion input parameter to converge toward the respective desired combustion input parameter.

15 Claims, 2 Drawing Sheets

INDIRECT HCCI COMBUSTION CONTROL

TECHNICAL FIELD

This disclosure relates to operation and control of homogeneous-charge compression-ignition (HCCI) engines.

BACKGROUND

The statements in this section merely provide background information related to the present disclosure. Accordingly, such statements are not intended to constitute an admission of prior art.

Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. For example, a homogeneous charge compression ignition (HCCI) combustion mode includes a distributed, flameless, auto-ignition combustion process that is controlled by oxidation chemistry, rather than by fluid mechanics. In a typical engine operating in HCCI combustion mode, the cylinder charge is nearly homogeneous in composition temperature at intake valve closing time. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low nitrous oxides (NOx) emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy. The HCCI engine can also operate at stoichiometry with substantial amounts of exhaust gas recirculation (EGR).

There is no direct control of start of combustion for an engine operating in the auto-ignition mode, as the chemical kinetics of the cylinder charge determine the start and course of the combustion. Chemical kinetics are sensitive to temperature and pressure, as such, the controlled auto-ignition combustion process is sensitive to temperature and pressure. One variable affecting the combustion initiation and progress is the effective temperature of the cylinder structure, i.e., temperature of cylinder walls, head, valve, and piston crown. Therefore, controlling the start of combustion for an engine operating in the auto-ignition mode is very hard to control, where poor combustion initiation timing can lead to poor overall combustion phasing.

It is known to control the start of combustion and combustion phasing based on differences between desired and monitored combustion output parameters. For instance, air-fuel ratio and peak pressure after a combustion event can be monitored and compared with respective desired combustion output parameters. However, the combustion output parameters can only be obtained after the combustion event has occurred, resulting in a complex and convolute relationship between maintaining desired combustion output parameters when monitored combustion output parameters deviate there from.

SUMMARY

A method for controlling combustion in a spark-ignition direct-injection internal combustion engine includes monitoring at least one combustion input parameter, and when the at least one monitored combustion input parameter deviates from a respective desired combustion input parameter, adjusting a combustion input mechanism associated with controlling the at least one monitored combustion input parameter to converge toward the respective desired combustion input parameter.

BRIEF DESCRIPTION OF THE DRAWINGS

One or more embodiments will now be described, by way of example, with reference to the accompanying drawings, in which.

DETAILED DESCRIPTION

Figure 1:
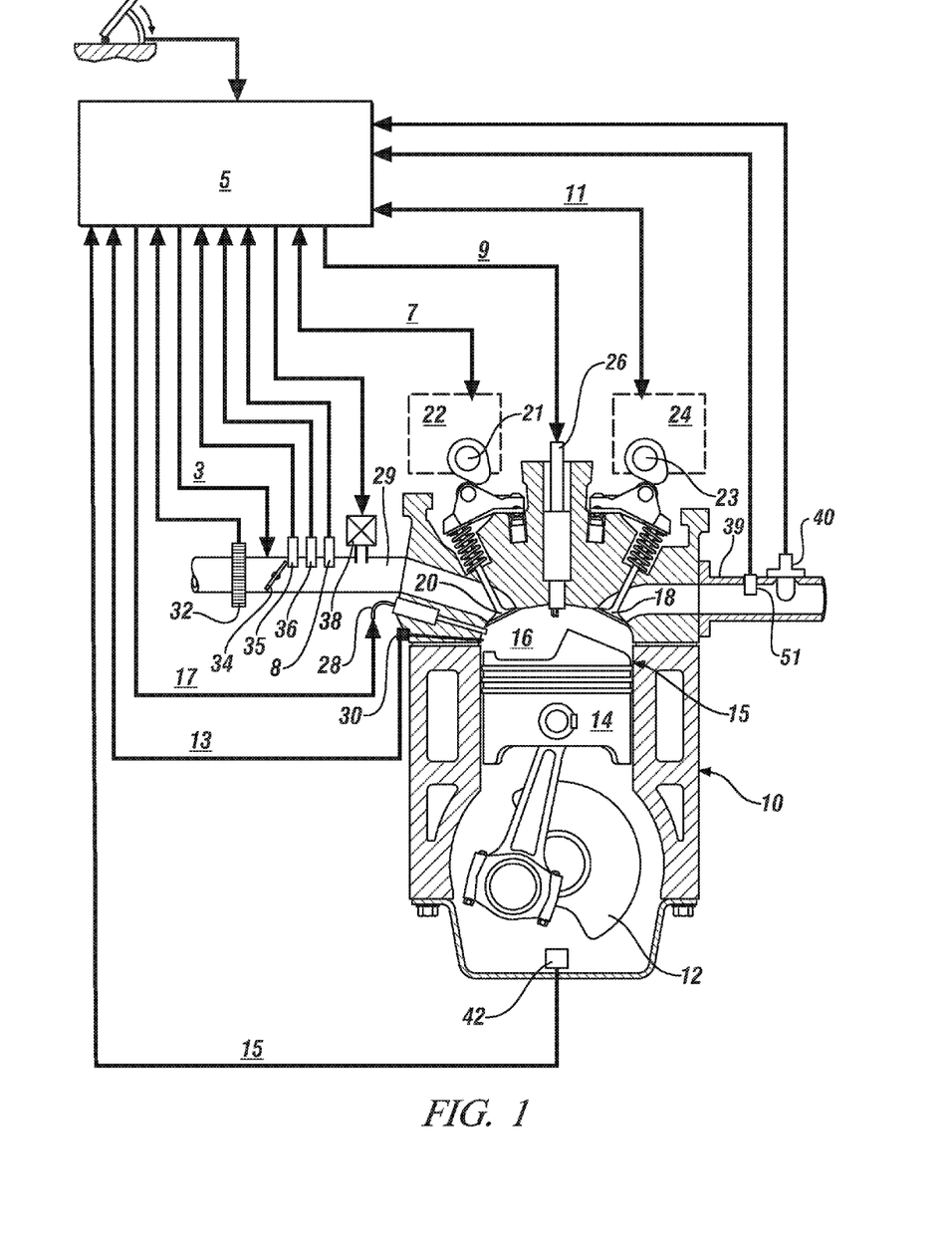
FIG. 1 illustrates an exemplary internal combustion engine system, in accordance with the present disclosure.

Referring now to the drawings, wherein the depictions are for the purpose of illustrating certain exemplary embodiments only and not for the purpose of limiting the same, FIG. 1 schematically shows an exemplary internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode and a homogeneous spark-ignition (SI) combustion mode. The engine 10 is selectively operative at a stoichiometric air/fuel ratio and at an air/fuel ratio that is primarily lean of stoichiometry. It is appreciated that the concepts in the disclosure can be applied to other internal combustion engine systems and combustion cycles.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow (MAF) sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an external exhaust gas recirculation (EGR) valve 38. The control module 5 is operative to control mass flow of exhaust gas to the intake manifold 29 by controlling opening of the EGR valve 38. Hence, an intake oxygen ($O_2$) concentration entering the engine can be controlled by controlling the opening of the EGR valve 38. In an exemplary embodiment, the intake $O_2$ concentration in the intake manifold 29 when the EGR valve 38 is closed is substantially 21%. The intake $O_2$ concentration can be monitored by an oxygen sensor 8.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to an intake phase control signal 7 from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to an exhaust phase control signal 11 from the control module 5.

The intake and exhaust VCP/VLC devices 22 and 24 each preferably include a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18, respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal 17 from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to an ignition control signal 9 from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine an indicated mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors. A pressure sensor 51 in the exhaust manifold 39 is configured to monitor manifold absolute pressure and barometric pressure in the exhaust manifold 39. Accordingly, a pressure ratio or difference can be determined based on the measurements between the pressure sensor 36 in the intake manifold 29 and the pressure sensor 51 in the exhaust manifold 39.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

In operation, the control module 5 monitors inputs from the aforementioned sensors to determine states of engine parameters. The control module 5 is configured to receive input signals from an operator (e.g., via an accelerator pedal and a brake pedal) to determine a torque request (To_req). It will be appreciated that the torque request can be in response to an operator input (e.g., via the accelerator pedal and the brake pedal) or the torque request can be in response to an auto start condition monitored by the control module 5. The control module 5 monitors the sensors indicating the engine speed and intake air temperature, and coolant temperature and other ambient conditions.

The control module 5 executes routines stored therein to control the aforementioned actuators to form the cylinder charge. In an exemplary embodiment, the control module 5 can control input actuators, referred to hereinafter as combustion input mechanisms, to control respective combustion input parameters to achieve robust combustion. For instance, controlling the throttle valve position can control intake manifold pressure, controlling a duration of negative valve overlap (NVO) can control intake mass airflow, controlling the EGR valve position opening can control intake $O_2$ concentration, controlling a pre-injected fuel mass timing can control an in-cylinder pressure ratio, controlling a fuel pulse width can control injected fuel mass and controlling at least one of a spark ignition timing and an injected fuel mass timing can control combustion initiation timing. Thus, controlling combustion input parameters can allow for robust combustion to be achieved prior to a cylinder event, rather than monitoring a difference between desired output parameters and monitored output parameters after combustion has already occurred. Controlling output parameters after combustion has occurred often results in complex and convoluted combustion control.

Valve timing and phasing can include NVO and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean or stoichiometric air/fuel ratio. Substantially wide-open throttle can include operating fully un-throttled, or slightly throttled to create a vacuum in the intake manifold 29 to affect EGR flow. In one embodiment, in-cylinder EGR mass (i.e., internal residual gas mass) is controlled to a high dilution rate. The intake and exhaust valves 20 and 18 are in the low-lift valve position and the intake and exhaust lift timing operate with NVO. One or more fuel injection events can be executed during an engine cycle including at least one fuel injection event during a compression phase.

During engine operation in the homogeneous spark-ignition (SI) combustion mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during a compression phase of an engine cycle, preferably substantially before TDC. Spark ignition is preferably discharged at a predetermined time subsequent to the fuel injection when air charge within the cylinder is substantially homogeneous.

Combustion phasing in each cylinder depends upon the thermal environment within each cylinder when the engine is operating in the controlled auto-ignition (HCCI) mode including spark-assisted HCCI mode during high-load operation. Combustion phasing describes the progression of combustion in a cycle as measured by the crank angle of the cycle. One convenient metric to judge combustion phasing is CA50 or the crank angle at which 50% of the air fuel charge is combusted. One will appreciate that properties of a combustion cycle, such as efficiency, combustion noise and combustion stability, are affected by CA50 of the cycle. Thus, maintaining an optimal/desired combustion phasing is important during high load HCCI operation.

As will become apparent a plurality of combustion input parameters can be monitored, where each of said combustion input parameters are associated with a respective combustion input mechanism configured to control at least the respective combustion input parameter. When at least one of the monitored combustion input parameters deviates from a respective desired combustion input parameter, at least the respective combustion input mechanism can be adjusted to converge the at least one combustion input parameter toward the respective desired combustion input parameter. It will be appreciated that the desired combustion input parameters are selected to maintain a desired combustion phasing for achieving acceptable combustion stability, combustion efficiency and combustion noise levels based on engine speed, engine load and in-cylinder temperature.

Figure 2:
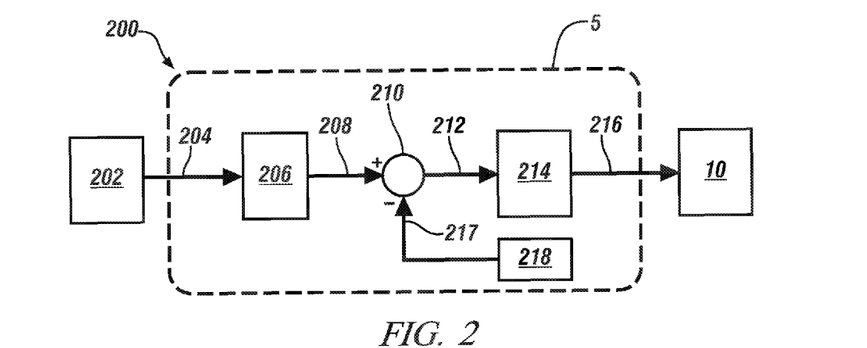
FIG. 2 illustrates a combustion input parameter controller for adjusting a combustion input mechanisms associated with controlling a monitored combustion input parameter to converge toward a respective desired combustion input parameter, in accordance with the present disclosure.

FIG. 2 illustrates a combustion input parameter controller (CIPC) 200 for adjusting a combustion input mechanism associated with controlling a monitored combustion input parameter to converge toward a respective desired combustion input parameter when the monitored combustion input parameter deviates from the respective desired combustion input parameter in accordance with the present disclosure. The CIPC 200 includes a torque module 202, a desired combustion input module (DCIM) 206, a difference unit 210, a monitored combustion input module (MCIM) 218 and a combustion input mechanism module (CIMM) 214. The control module 5 has supervisory control over the DCIM 206, the difference unit 210, the MCIM 218 and the CIMM 214. Based on engine operating parameters 204, the DCIM 206 determines a desired combustion input parameter 208. The desired combustion input parameter 208 is determined to achieve a desired combustion phasing based on the engine operating parameters 204. The desired combustion phasing is determined for maintaining acceptable combustion properties including combustion noise, combustion efficiency and combustion stability. The engine operating parameters 204 can include desired engine speed, desired in-cylinder temperature, desired injected fuel mass and/or desired engine load in response to a torque request obtained by the torque module 202. The torque request can be in response to an operator input (e.g., via the accelerator pedal and the brake pedal), or the torque request can be in response to an auto start condition monitored by the control module 5.

The desired combustion input parameter 208 is input to the difference unit 210 and compared with a monitored combustion input parameter 217 output by the MCIM 218. Based on the comparing, the difference unit 210 determines a combustion input parameter deviation 212 that is input to the CIMM 214.

The CIMM 214 is configured to adjust the combustion input mechanism for controlling the monitored combustion input parameter 217 to converge toward the desired combustion input parameter 208. In other words, the CIMM 214 adjusts the combustion input mechanism by an amount corresponding to the amount the combustion input parameter 216 deviates from the desired combustion input parameter 208 (e.g., by an amount corresponding to the combustion input parameter deviation 212). Alternative embodiments discussed below with reference to FIG. 3 can include determining a coupling between a plurality of deviated combustion input parameters and respective ones of a plurality of combustion input mechanisms based on the engine operating mode, where at least one of the combustion input mechanisms can be adjusted in accordance with the determined coupling. An adjusted combustion input mechanism parameter 216 is input to the engine 10 for controlling the monitored combustion input parameter 217 to converge toward the respective desired combustion input parameter 218.

In an exemplary embodiment of the present disclosure, the monitored combustion input parameter 217 corresponds to a monitored manifold pressure, the desired combustion input parameter 208 corresponds to a desired manifold pressure and the adjusted combustion input mechanism parameter 216 corresponds to an adjusted throttle valve position associated with controlling the monitored manifold pressure to converge toward the desired manifold pressure. The manifold pressure can include a manifold pressure ratio describing a ratio of an intake manifold pressure over an exhaust manifold pressure obtained by the intake manifold pressure sensor 36 and the exhaust manifold pressure sensor 51, respectively. In another exemplary embodiment, the manifold pressure can include a manifold pressure difference describing a difference between the intake manifold pressure and the exhaust manifold pressure obtained by the intake manifold pressure sensor 36 and the exhaust manifold pressure sensor 51, respectively. Monitoring at least one of the manifold pressure ratio and the manifold pressure difference can correlate to internal residual gas mass within the cylinder from a previous combustion cycle, where adjusting the throttle valve position can increase or decrease the manifold pressure ratio and the manifold pressure difference. The amount the throttle valve position is adjusted can correspond to an amount proportional to the combustion input parameter deviation 212. Adjusting throttle valve position associated with controlling the at least one of the monitored manifold pressure ratio and the monitored manifold pressure difference can be dominantly utilized when a substantially wide-open throttle is not desirable, such as during stoichiometric operating modes. However, it will be appreciated that the throttle valve position can be slightly adjusted (e.g., throttled) to create a vacuum in the intake manifold 29 to affect external EGR flow entering the engine even when substantially wide-open throttle is preferred.

In another exemplary embodiment of the present disclosure, the monitored combustion input parameter 217 corresponds to a monitored intake mass airflow (MAF), the desired combustion input parameter 208 corresponds to a desired intake MAF and the adjusted combustion input mechanism parameter 216 corresponds to an adjusted duration of negative valve overlap in each cylinder associated with controlling the monitored intake MAF to converge toward the desired intake MAF. The adjusted duration of negative valve overlap in each cylinder is defined by the duration of crank angle between exhaust valve closing and intake valve opening. The intake MAF is monitored by the MAF sensor 36. The monitored intake MAF can correlate to the amount of internal residual gas mass within the cylinder from a previous combustion cycle, where adjusting the duration of negative valve overlap influences the amount of internal residual gas mass. Hence, the desired intake MAF can correlate to a desired amount of internal residual gas mass within each cylinder based on the engine operating parameters 204. In particular, increased internal residual gas mass from a previous cycle can be retained with earlier closing of the exhaust valve (i.e., advancing closing of the exhaust valve), which leaves less room for incoming fresh air mass. The net effects are higher cylinder charge temperature and lower cylinder oxygen concentration. Hence, adjusting the duration of negative valve overlap in each cylinder can increase or decrease the monitored intake MAF. The amount of duration the negative valve overlap is advanced or retarded can correspond to an amount proportional to the combustion input parameter deviation 212. It will be appreciated that adjusting the duration of negative valve overlap associated with controlling the monitored intake MAF to converge toward the desired intake MAF is preferably utilized when the engine is operating with an air-fuel ratio that is lean of stoichiometry.

In another exemplary embodiment of the present disclosure, the monitored combustion input parameter 217 corresponds to a monitored intake $O_2$ concentration, the desired combustion input parameter 208 corresponds to a desired intake $O_2$ concentration and the adjusted combustion input mechanism parameter 216 corresponds to an adjusted external EGR valve position (i.e., EGR valve 38 illustrated in FIG. 1) associated with controlling the monitored intake $O_2$ concentration to converge toward the desired intake $O_2$ concentration. The intake $O_2$ concentration entering the engine 10 can be directly controlled via the EGR valve 38 position. The intake $O_2$ concentration is monitored by the oxygen sensor 8. The intake $O_2$ concentration correlates to the external EGR percentage entering the engine. For instance, intake $O_2$ concentration decreases as external EGR percentage increases and intake $O_2$ concentration increases as external EGR percentage decreases. Therefore, when the monitored intake $O_2$ concentration is less than the desired intake $O_2$ concentration, the external EGR percentage is too high and a combustion phasing that is too retarded from a desired combustion phasing can result. A retarded combustion phasing refers to a combustion phasing occurring later in the combustion cycle. Likewise, when the monitored intake $O_2$ concentration is greater than, or exceeds, the desired intake $O_2$ concentration, the monitored external EGR percentage is too low and a combustion phasing that is too advanced from the desired combustion phasing can result. An advanced combustion phasing refers to a combustion phasing occurring earlier in the combustion cycle. Therefore, adjusting the external EGR valve position can increase or decrease the monitored intake $O_2$ concentration. The amount the external EGR valve position is adjusted can correspond to an amount proportional to the combustion input parameter deviation 212.

In another exemplary embodiment of the present disclosure, the monitored combustion input parameter 217 corresponds to a monitored in-cylinder pressure ratio, the desired combustion input parameter 208 corresponds to a desired in-cylinder pressure ratio and the adjusted combustion input mechanism parameter 216 corresponds to an adjusted injected fuel mass timing associated with controlling the monitored in-cylinder pressure ratio to converge toward the desired in-cylinder pressure ratio. The desired in-cylinder pressure ratio can be selected to achieve a desired fuel mass reformation during low engine speed and load operating conditions, where the desired fuel mass reformation is selected in accordance with maintaining a desired combustion phasing. Specifically, the adjusted injected fuel mass timing includes adjusting a first injected fuel mass (i.e., pre-injected fuel mass) timing during a recompression stroke of a split fuel injection strategy utilized for maintaining a desired fuel mass reformation during low engine speeds and loads. In an exemplary embodiment, fuel mass reformation increases when the pre-injected fuel mass timing is advanced. In another exemplary embodiment, fuel mass reformation decreases when the pre-injected fuel mass timing is retarded. The in-cylinder pressure ratio describes a monitored in-cylinder pressure after top dead center during the intake stroke over a monitored in-cylinder pressure before top dead center during an exhaust or recompression stroke. Utilizing in-cylinder pressure ratios to control reforming required to support combustion cycles in HCCI combustion at low engine speeds and loads and maintaining a desired fuel mass reformation based on adjusting a first injection timing of a split injection strategy is disclosed in co-pending U.S. application Ser. No. 12/338,028, which is incorporated herein by reference. The amount the first injection timing is advanced or retarded can correspond to an amount proportional to the combustion input parameter deviation 212.

In another exemplary embodiment of the present disclosure, the monitored combustion input parameter 217 corresponds to a monitored injected fuel mass, the desired combustion input parameter 208 corresponds to a desired injected fuel mass and the adjusted combustion input mechanism parameter 216 corresponds to an adjusted fuel pulse width associated with controlling the monitored injected fuel mass to converge toward the desired injected fuel mass. The monitored injected fuel mass can be determined by the product of monitored intake MAF (e.g., obtained by MAF sensor 32 in FIG. 1) and monitored air-fuel ratio (e.g., obtained by air-fuel ratio sensor 40). The fuel pulse width is a duration defined to inject a predetermined fuel mass from the fuel injector 28 into the cylinder. For instance, increasing the fuel pulse width increases the injected fuel mass. Likewise, decreasing the fuel pulse width decreases the injected fuel mass. The amount the fuel pulse width is adjusted can correspond to an amount proportional to the combustion input parameter deviation 212.

In another exemplary embodiment of the present disclosure, the monitored combustion input parameter 217 corresponds to a monitored combustion initiation timing in each cylinder, the desired combustion input parameter 208 corresponds to a desired combustion initiation timing and the adjusted combustion input mechanism parameter 216 corresponds to at least one of an adjusted spark ignition timing and an injected fuel mass timing, each of said spark ignition timing and said injected fuel mass timing associated with controlling the monitored combustion initiation timing in each cylinder to converge toward the desired combustion initiation timing. Spark-assisted HCCI mode can be utilized during high-load operation. Spark assist can be utilized when the engine is operating with a stoichiometric air-fuel ratio. The adjusting at least one of said adjusted spark ignition timing and said injected fuel mass timing corresponds to one of advancing or retarding the combustion initiation timing in each cylinder. When the engine is operating in a controlled auto-ignition (HCCI) mode, adjusting said injected fuel mass timing can be dominantly utilized where the adjusted injected fuel mass timing includes delivering the injected fuel mass in a single injection defined by a crank angle location at an end of injection. When the engine is operating with a stoichiometric air-fuel ratio including spark-assisted ignition, adjusting said spark ignition timing can be dominantly utilized.

Figure 3:
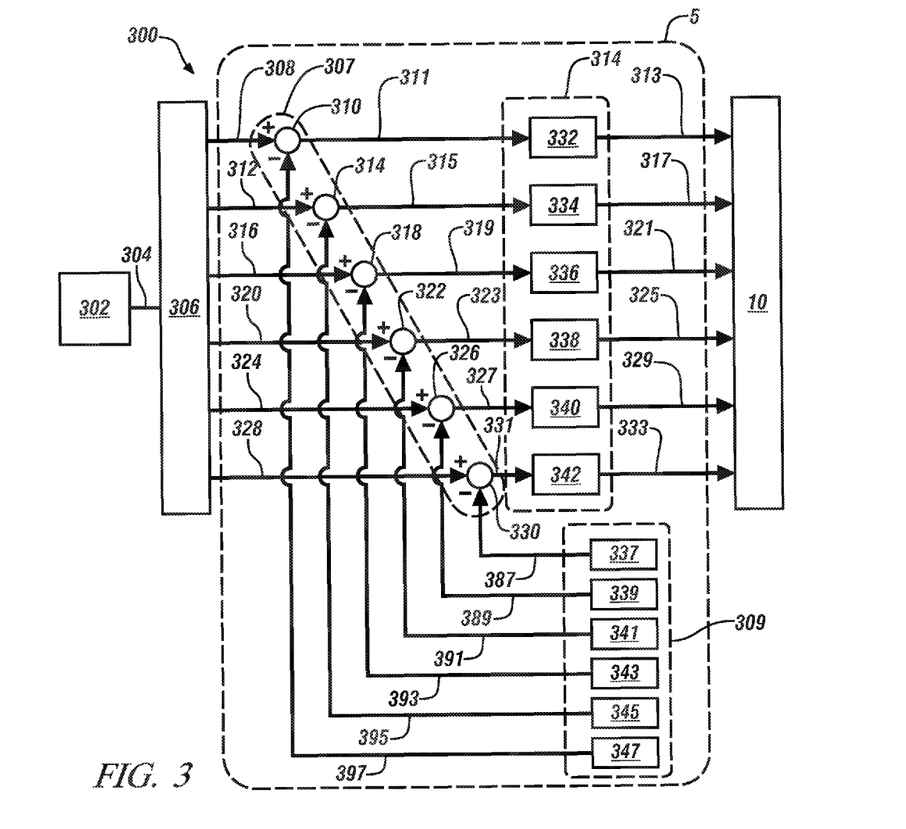
FIG. 3 illustrates a combustion input parameter controller for monitoring a plurality of combustion input parameters and adjusting respective combustion input mechanisms for controlling each respective combustion input parameter that deviates from a respective desired combustion input parameter, in accordance with the present disclosure.

FIG. 3 illustrates a combustion input parameter controller (CIPC) 300 for monitoring a plurality of combustion input parameters, where each combustion input parameter is associated with a respective combustion input mechanism configured to control at least the respective combustion input parameter. When at least one of the monitored combustion input parameters deviates from a respective desired combustion input parameter, at least the respective combustion input mechanism can be adjusted to converge the at least one combustion input parameter toward the respective desired combustion input parameter. The CIPC 300 includes a torque module 302, a desired combustion input module (DCIM) 306, a plurality of difference units 307, a monitored combustion input module (MCIM) 309, and a combustion input mechanism module (CIMM) 314. The control module 5 has supervisory control over the DCIM 306, the plurality of difference units 307, the MCIM 309 and the CIMM 314.

The MCIM 309 further includes a manifold pressure ratio module (MPRM) 337, an intake mass air flow module (MAFM) 339, an intake $O_2$ concentration module (IOCM) 341, an in-cylinder pressure module (ICPM) 343, an injected fuel mass module (IFMM) 345 and a combustion initiation timing module (CITM) 347. The MPRM 337 monitors at least one of a manifold pressure ratio and a manifold pressure difference 387, the MAFM 339 monitors an intake MAF 389, the IOCM 341 monitors an intake $O_2$ concentration 391, the ICPM 343 monitors an in-cylinder pressure 393, the IFMM 345 monitors an injected fuel mass and the CITM 347 monitors a combustion initiation timing 397.

The CIMM 314 includes a spark ignition timing and injected timing module (SITM) 332 for controlling combustion initiation timing in each cylinder, a fuel pulse width module FPWM 334, an injected fuel mass timing module (IFTM) 336, an EGR valve position module (EVPM) 338, an NVO module (NVOM) 340 and a throttle position module (TPM) 342.

Based on engine operating parameters 304, the DCIM 306 determines a plurality of desired combustion input parameters 308, 312, 316, 320, 324 and 328. Each of the plurality of desired combustion input parameters 308, 312, 316, 320, 324 and 328 are determined to achieve and maintain a desired combustion phasing based on the engine operating parameters 304. The plurality of desired combustion input parameters include a desired combustion initiation timing 308, a desired injected fuel mass 312, a desired in-cylinder pressure 316, a desired intake $O_2$ concentration 320, a desired intake mass airflow 324 and at least one of a desired manifold pressure ratio and a desired manifold pressure difference 328. The desired combustion phasing is determined for maintaining acceptable combustion properties including combustion noise, combustion efficiency and combustion stability. The engine operating parameters 304 can include desired engine speed, desired in-cylinder temperature, desired injected fuel mass and/or desired engine load in response to a torque request obtained by the torque module 302. The torque request can be in response to an operator input (e.g., via the accelerator pedal and the brake pedal), or the torque request can be in response to an auto start condition monitored by the control module 5.

Each of the desired combustion input parameters 308, 312, 316, 320, 324 and 328 are input to a respective difference unit 310, 314, 318, 322, 326 and 330 and compared with each respective monitored combustion input parameter 397, 395, 393, 391, 389 and 387. Based on the comparing, each difference unit 310, 314, 318, 322, 326 and 330 determines a respective combustion input deviation 311, 315, 319, 323, 327 and 331 that is input to the respective module 332, 334, 336, 338, 340 and 342 of the CIMM 314.

Each module 332, 334, 336, 338, 340 and 342 adjusts a respective combustion input mechanism parameter, where each respective combustion input mechanism is associated with respective ones of the monitored combustion input parameters 397, 395, 393, 391, 389 and 387. Hence, each combustion input mechanism can be adjusted for controlling each respective combustion input parameter that deviates from the respective desired combustion input parameter. The adjusting converges each monitored input parameter towards respective ones of the desired combustion input parameters. Hence, each module 332, 334, 336, 338, 340 and 342 can adjust each respective combustion input mechanism parameter by an amount corresponding to the respective combustion input parameter deviation 311, 315, 319, 323, 327 and 331. Accordingly, each module 332, 334, 336, 338, 340 and 342 outputs a respective adjusted combustion input mechanism 313, 317, 321, 325, 329 and 333 that is input to the engine 10 for controlling each respective combustion input parameter to converge towards respective ones of the desired combustion input parameters.

The CIPC 200 of FIG. 2 enables monitoring of a single combustion input parameter, where a separate CIPC 200 is required for each combustion input parameter being monitored, and potentially controlled via adjusting the associated combustion input mechanism to converge the monitored combustion input parameter toward the respective desired combustion input parameter. On the other hand, the exemplary CIPC 300 enables monitoring a plurality of combustion input parameters (e.g., combustion input parameters 387, 389, 391, 393, 395 and 397) without the need of a separate controller for each of the combustion input parameters. Accordingly, the CIPC 300 of FIG. 3 can accomplish all of the functions of the various embodiments of the CIPC 200 of FIG. 2 described above in a single controller configured to adjust each respective combustion input mechanism for controlling each respective combustion input parameter that deviates from a respective desired combustion input parameter in order to converge each combustion input parameter towards respective ones of the desired combustion input parameters. However, the CIPC 300 is not limited to the plurality of combustion parameters input listed above, and can additionally monitor any combination of combustion input parameters depending upon engine operation, engine speed, engine load and in-cylinder temperature.

Additionally, when more than one of the combustion input parameters deviate from respective ones of the plurality of desired combustion input parameters, the CIMM 314 can be configured to determine a coupling between each of the deviated combustion input parameters and each respective combustion input mechanism based on the engine operating mode. An amount of deviation between each of the deviated combustion input parameters and the respective ones of the desired combustion input parameters can be monitored. Accordingly, at least one of the respective combustion input mechanisms can be adjusted in accordance with the determined coupling and the amount of deviations to converge each of the deviated combustion input parameters toward each respective desired combustion input parameter. For instance, in addition to controlling the intake $O_2$ concentration entering the engine, adjusting the external EGR percentage entering the engine can additionally control or influence the intake mass airflow. Similarly, in addition to controlling the intake mass airflow, adjusting a duration of negative valve overlap can additionally control or influence a manifold pressure metric including at least one of a manifold pressure ratio and a manifold pressure difference.

In a non limiting example, when the engine operating mode is stoichiometric, and in response to a monitored manifold pressure ratio deviating (e.g., deviated manifold pressure ratio) from a desired manifold pressure ratio and a monitored intake $O_2$ concentration deviating (e.g., deviated intake $O_2$ concentration) from a desired intake $O_2$ concentration, the CIMM 314 can determine a coupling between each of the deviated combustion input parameters including the manifold pressure ratio and the intake $O_2$ concentration and each of the respective combustion input mechanisms including a throttle valve position respective to the manifold pressure ratio and an external EGR percentage entering the engine respective to the intake $O_2$ concentration. When the amount of deviation between the manifold pressure ratio and the desired manifold pressure ratio is greater than the amount of deviation between the intake $O_2$ concentration and the desired intake $O_2$ concentration, the throttle valve position can be dominantly adjusted and the external EGR percentage entering the engine can be secondarily adjusted in accordance with the determined coupling and the amount of deviations to converge the manifold pressure ratio toward the desired manifold pressure ratio and the intake $O_2$ concentration toward the desired intake $O_2$ concentration. When the amount of deviation between the intake $O_2$ concentration and the desired intake $O_2$ concentration is greater than the amount of deviation between the manifold pressure ratio and the desired manifold pressure ratio, the external EGR percentage entering the engine can be dominantly adjusted and the throttle valve position can be secondarily adjusted in accordance with the determined coupling and the amount of deviations to converge the deviated manifold pressure ratio toward the desired manifold pressure ratio and the deviated intake $O_2$ concentration toward the desired intake $O_2$ concentration.

It will be appreciated that secondarily adjusting a combustion input mechanism corresponds to adjusting the combustion input mechanism by an amount less than required to converge a respective combustion input parameter towards achieving a respective desired combustion input parameter. Thus, secondarily adjusting the combustion input mechanism can be utilized to converge the respective combustion input parameter toward the desired combustion input parameter in accordance with a determined coupling with another combustion input mechanism that is respective to another combustion input parameter that deviates from a respective desired combustion input parameter, whereas the other combustion input mechanism is dominantly adjusted and thereby influencing each of the deviated combustion input parameters to converge toward their respective desired combustion input parameters.

In another non-limiting example, when the engine operating mode is lean of stoichiometry, and in response to a monitored intake mass airflow deviating (e.g., deviated intake mass airflow) from a desired intake mass airflow and a monitored manifold pressure ratio deviating (e.g., deviated manifold pressure ratio) from a desired manifold pressure ratio, the CIMM 314 can determine a coupling between each of the deviated combustion input parameters including the intake mass airflow and the manifold pressure ratio and each of the respective combustion input mechanisms including a duration of negative valve overlap respective to the intake mass airflow and a throttle valve position respective to the manifold pressure ratio. The duration of negative valve overlap can be dominantly adjusted and the throttle valve position can be secondarily adjusted in accordance with the determined coupling and the amount of deviations to converge the deviated intake mass airflow toward the desired intake mass airflow and the deviated manifold pressure ratio toward the desired manifold pressure ratio.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling combustion in a spark-ignition direct-injection internal combustion engine, comprising:
    within a dedicated engine control module of a motor vehicle, controlling engine operating parameters to achieve desired operation of the internal combustion engine, the controlling comprising programming configured to:
        prior to an upcoming combustion event, monitor a plurality of combustion input parameters for the upcoming combustion event selected from
        a single value selected from a manifold pressure value, an intake mass air flow, and an in-cylinder pressure,
        an intake $O_2$ concentration,
        an injected fuel mass, and
        a combustion initiation timing; and
    when at least one of the monitored combustion input parameters deviates from a respective desired combustion input parameter,
        determine a coupling relationship comprising effects that changing at least one of the monitored combustion input parameters has on the other combustion input parameters, and
        adjust a plurality of input mechanisms associated with controlling the at least one monitored combustion input parameter to converge toward the respective desired combustion input parameter based upon the determined coupling relationship.

2. The method of claim 1 wherein adjusting said combustion input mechanisms comprises adjusting a throttle valve position associated with controlling a manifold pressure metric to converge manifold pressure toward a desired manifold pressure.

3. The method of claim 2 wherein said manifold pressure metric comprises at least one of:
    a manifold pressure ratio comprising a ratio of an intake manifold pressure to an exhaust manifold pressure; and
    a manifold pressure difference comprising a difference between the intake manifold pressure and the exhaust manifold pressure.

4. The method of claim 1 wherein adjusting said combustion input mechanisms comprises adjusting a duration of negative valve overlap between an exhaust valve closing and an intake valve opening for each cylinder associated with controlling an intake mass airflow to converge toward a desired intake mass airflow.

5. The method of claim 1 wherein adjusting said combustion input mechanisms comprises adjusting an EGR valve position associated with controlling an intake $O_2$ concentration to converge toward a desired intake $O_2$ concentration.

6. The method of claim 1 wherein adjusting said combustion input mechanisms comprises adjusting an injected fuel mass timing associated with controlling an in-cylinder pressure ratio to converge toward a desired in-cylinder pressure ratio selected to maintain a desired fuel mass reformation based on an engine speed, an engine load and an in-cylinder temperature.

7. The method of claim 6 wherein adjusting the injected fuel mass timing comprises adjusting a pre-injected fuel mass timing during a recompression stroke in a split fuel injection strategy utilized for fuel mass reformation at low engine speeds and loads; and the in-cylinder pressure ratio comprises a ratio of an in-cylinder pressure after top dead center during an intake stroke to an in-cylinder pressure before top dead center during the recompression stroke.

8. The method of claim 1 wherein adjusting said combustion input mechanisms comprises adjusting an amount of fuel pulse width associated with controlling a monitored injected fuel mass to converge toward a desired injected fuel mass.

9. The method of claim 1 wherein adjusting said combustion input mechanisms comprises adjusting at least one of a spark ignition timing and an injected fuel mass timing, each of said spark ignition timing and said injected fuel mass timing associated with controlling a combustion initiation timing to converge toward a desired combustion initiation timing.

10. The method of claim 9 wherein adjusting at least one of said spark ignition timing and said injected fuel mass timing comprises:
    when the engine is operating in a controlled auto-ignition mode, dominantly utilizing said adjusted injected fuel mass timing comprising delivering a fuel mass in a single injection; and
    when the engine is operating with a stoichiometric air-fuel ratio including spark-assisted ignition, dominantly utilizing said adjusted spark ignition timing.

11. The method of claim 1 wherein adjusting said combustion input mechanisms comprises adjusting the combustion input mechanism by an amount corresponding to the amount the combustion input parameter deviates from the respective desired combustion input parameter.

12. Method for controlling combustion in a spark-ignition direct-injection internal combustion engine, comprising:
    within a dedicated engine control module of a motor vehicle, controlling engine operating parameters to achieve desired operation of the internal combustion engine, the controlling comprising programming configured to:
        prior to an upcoming combustion event, monitor a plurality of combustion input parameters for the upcoming combustion event selected from and
        a single value selected from a manifold pressure value, an intake mass air flow, and an in-cylinder pressure,
        an intake $O_2$ concentration,
        an injected fuel mass, and
        a combustion initiation timing;
    when at least one of the monitored combustion input parameters deviates from a respective desired combustion input parameter,
        determine a coupling relationship comprising effects that changing at least one of the monitored combustion input parameters has on the other combustion input parameters, and
        adjust a plurality of input mechanisms associated with controlling the at least one monitored combustion input parameter to converge toward the respective desired combustion input parameter based upon the determined coupling relationship;

wherein the desired combustion input parameters are selected to maintain a desired combustion phasing for achieving acceptable combustion stability, combustion efficiency and combustion noise levels based on an engine speed, an engine load and an in-cylinder temperature.

13. The method of claim 12 wherein when more than one of the monitored combustion input parameters deviates from respective ones of the desired combustion input parameters, and when the engine operating mode is stoichiometric:

determining a coupling between each of the deviated combustion input parameters comprising a manifold pressure ratio and an intake $O_2$ concentration and each of the respective combustion input mechanisms comprising a throttle valve position respective to the manifold pressure ratio and an external EGR percentage entering the engine respective to the intake $O_2$ concentration; and one of when an amount of deviation between the manifold pressure ratio and a desired manifold pressure ratio is greater than an amount of deviation between the intake $O_2$ concentration and a desired intake $O_2$ concentration, dominantly adjusting the throttle valve position and secondarily adjusting the external EGR percentage entering the engine in accordance with the respective coupling and the respective amounts of deviation to converge the manifold pressure ratio toward the desired manifold pressure ratio and the intake $O_2$ concentration toward the desired intake $O_2$ concentration, and when an amount of deviation between the intake $O_2$ concentration and the desired intake $O_2$ concentration is greater than an amount of deviation between the manifold pressure ratio and the desired manifold pressure ratio, dominantly adjusting the external EGR percentage entering the engine and secondarily adjusting throttle valve position in accordance with the respective coupling and the respective amounts of deviation to converge the deviated manifold pressure ratio toward the desired manifold pressure ratio and the deviated intake $O_2$ concentration toward the desired intake $O_2$ concentration.

14. The method of claim 12 wherein when more than one of the monitored combustion input parameters deviates from respective ones of the plurality of desired combustion input parameters, and when the engine operating mode is lean of stoichiometry:

determining a coupling between each of the deviated combustion input parameters comprising an intake mass airflow and a manifold pressure ratio and each of the respective combustion input mechanisms comprising a duration of negative valve overlap respective to the intake mass airflow and a throttle valve position respective to the manifold pressure ratio; and dominantly adjusting the duration of negative valve overlap and secondarily adjusting throttle valve position in accordance with the respective coupling and the respective amounts of deviation to converge the deviated intake mass airflow toward a desired intake mass airflow and the deviated manifold pressure ratio toward a desired manifold pressure ratio.

15. Apparatus for controlling a multi-cylinder spark-ignition direct-injection internal combustion engine, comprising:

a control module comprising,
a module, prior to an upcoming combustion event, monitoring a plurality of combustion input parameters for the upcoming combustion event selected from
a single value selected from a manifold pressure value, an intake mass air flow, and an in-cylinder pressure,
an intake $O_2$ concentration,
an injected fuel mass, and
a combustion initiation timing; and
a module determining a coupling relationship comprising effects that changing at least one of the monitored combustion input parameters has on the other combustion input parameters and adjusting a plurality of combustion input mechanisms associated with controlling the at least one monitored combustion input parameter to converge toward the respective desired combustion input parameter based upon the coupling relationship when the at least one monitored combustion input parameter deviates from a respective desired combustion input parameter.

* * * * *